US011281813B1

(12) United States Patent
Morgan et al.

(10) Patent No.: US 11,281,813 B1
(45) Date of Patent: Mar. 22, 2022

(54) METHODS AND APPARATUS FOR AUTHENTICATING AN ENCRYPTION KEY STORED IN REMOVABLE MEMORY DEVICES, TO ACCESS A COMPUTE DEVICE

(71) Applicant: Management Services Group, Inc., Virginia Beach, VA (US)

(72) Inventors: Thomas Scott Morgan, Virginia Beach, VA (US); Martin Mayer, Bartlesville, OK (US); Steven Yates, Charlottesville, VA (US)

(73) Assignee: Management Services Group, Inc., Virginia Beach, VA (US)

( * ) Notice: Subject to any disclaimer, the term of this patent is extended or adjusted under 35 U.S.C. 154(b) by 0 days.

(21) Appl. No.: 17/381,636

(22) Filed: Jul. 21, 2021

Related U.S. Application Data

(60) Provisional application No. 63/057,459, filed on Jul. 28, 2020.

(51) Int. Cl.
*G06F 21/00* (2013.01)
*G06F 21/79* (2013.01)
*G06F 21/72* (2013.01)
*G06F 21/32* (2013.01)
*G06F 21/60* (2013.01)

(52) U.S. Cl.
CPC .............. *G06F 21/79* (2013.01); *G06F 21/32* (2013.01); *G06F 21/602* (2013.01); *G06F 21/72* (2013.01); *G06F 2221/0753* (2013.01)

(58) Field of Classification Search
CPC ........ G06F 21/79; G06F 21/32; G06F 21/602; G06F 21/72; G06F 2221/0753
See application file for complete search history.

(56) References Cited

U.S. PATENT DOCUMENTS

| | | | | |
|---|---|---|---|---|
| 2013/0044881 A1* | 2/2013 | Chang | ................... | H04L 9/0819 380/278 |
| 2016/0132699 A1* | 5/2016 | Miller | ..................... | G06F 21/80 713/193 |

* cited by examiner

*Primary Examiner* — Jeffrey C Pwu
*Assistant Examiner* — William A Corum, Jr.
(74) *Attorney, Agent, or Firm* — Cooley LLP

(57) ABSTRACT

In some embodiments, a method can include detecting, at a first circuit, the first circuit being operatively coupled to a memory device having a set of memory portions. The method can include receiving, from the memory device and at the first circuit, a set of encryption key portions after the detecting, each encryption key portion from the encryption key portions being a unique portion of an encryption key. The method can include assembling the encryption key by ordering each encryption key portion from the set of encryption key portions based on (1) a first previously defined list and (2) a second previously defined list. The first previously defined list and the second previously defined list each is stored at or accessible by the first circuit but not stored at or accessible by the memory device. The method can include authorizing access to a second circuit based on the encryption key.

17 Claims, 5 Drawing Sheets

METHODS AND APPARATUS FOR AUTHENTICATING AN ENCRYPTION KEY STORED IN REMOVABLE MEMORY DEVICES, TO ACCESS A COMPUTE DEVICE

CROSS REFERENCE TO RELATED APPLICATION

This application claims priority to and the benefit of U.S. Patent Application No. 63/057,459, filed Jul. 28, 2020 and entitled "Electronic Secure Key," which is incorporated herein by reference in its entirety.

TECHNICAL FIELD

The present disclosure relates to the field of computer security, and in particular to methods and apparatus related to using removable memory devices that can be operatively coupled to a compute device to authenticate an access to the compute device.

BACKGROUND

Known methods and apparatus for electronic security involve authentication techniques to restrict access to an electronic device only to authorized users. Authentication factors in known methods and apparatus for electronic security often include passwords, biometrics, or security cards. Such authentication factors can be checked after the electronic device has already started up and attained of a certain degree of functionality. Such self-checking of authentication factors by the electronic device after startup can inherently lead to security vulnerabilities.

When sensitive data or software is present in the electronic device, security-related challenges of self-checking of authentication factors can become nearly insurmountable. Thus, a need exists for improved electronic security for authenticating users with fewer of the self-referential vulnerabilities of known methods and apparatus.

SUMMARY

In some embodiments, a method can include detecting, at a first circuit, the first circuit being operatively coupled to a memory device having a set of memory portions. The method can further include receiving, from the memory device and at the first circuit, a set of encryption key portions after the detecting, each encryption key portion from the encryption key portions being a unique portion of an encryption key. The method can further include assembling the encryption key by ordering each encryption key portion from the set of encryption key portions based on (1) a first previously-defined list and (2) a second previously-defined list. The first previously-defined list and the second previously-defined list each is stored at or accessible by the first circuit but not stored at or accessible by the memory device. The method can further include authorizing access to a second circuit based on the encryption key.

DETAILED DESCRIPTION

Figure 1:
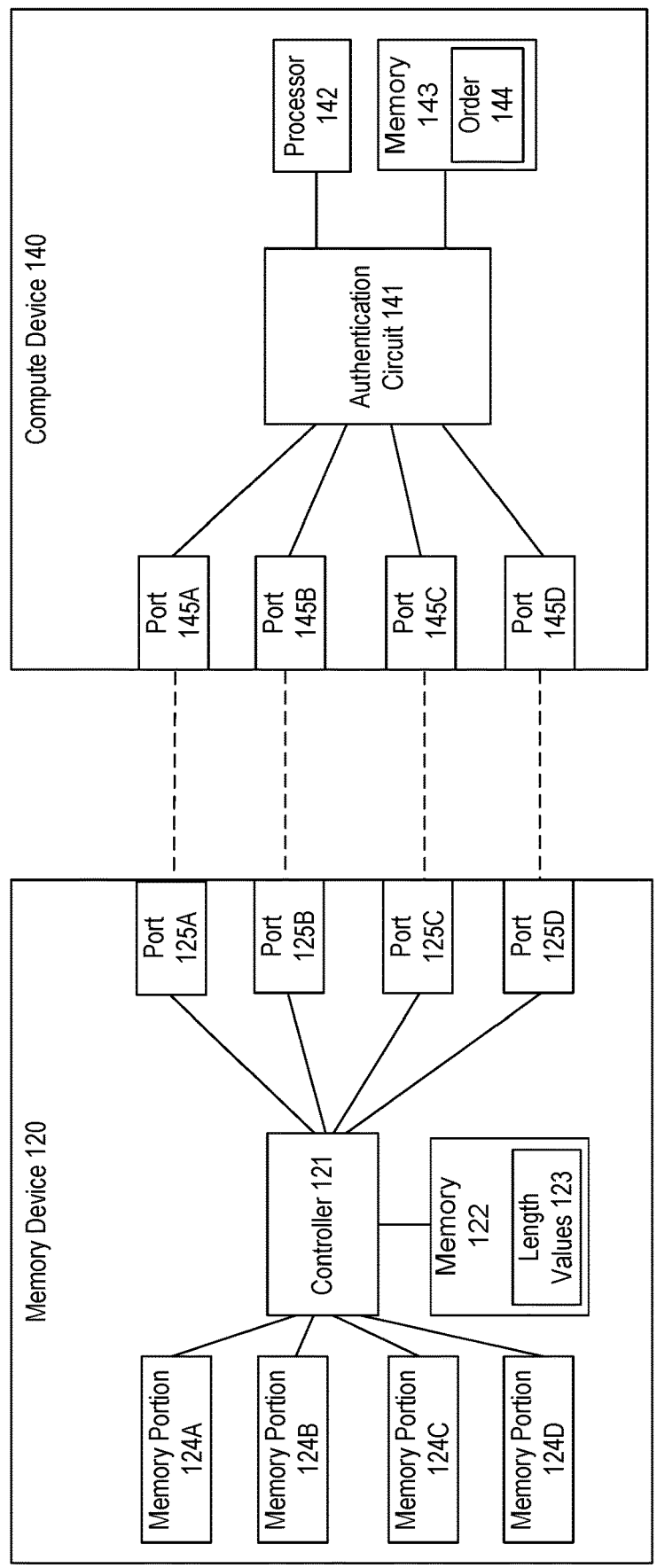
FIG. 1 is a block diagram that illustrates a memory device that is used to access a compute device, according to an embodiment.

Non-limiting examples of various aspects and variations of the embodiments are described herein and illustrated in the accompanying drawings.

Computer devices and systems can be generally used to generate, process, store, execute, and/or communicate data and/or instructions. Sometimes, the data and/or instructions present in computers can be sensitive in nature. Because of the negative outcomes that could result from unauthorized use of or access to these sensitive systems, apparatus and method for securing access to such sensitive data and/or instructions (e.g., to prevent unauthorized use or access) are desired. Authentication of users can be done using passwords, biometrics, or physical security devices such as security cards as part of the operation of the computer devices. Although using passwords, biometrics, or physical security devices could be an adequate approach in some electronic devices, in some applications or use cases, a higher degree of security is desired. When sensitive data or specialized software is present, relying on a computer device to authenticate its own user can generate an inherent self-referential vulnerability that can be exploited by adversaries to launch cyberattacks or to gain unauthorized use or access.

To overcome the aforementioned challenges, the electronic security apparatus and methods described herein can use one or more removable memory devices (physical security devices), which may be inserted individually or as an integrated assembly and contain encryption key portions (security factors) required for a protected compute device (electronic device) to commence operation. Together, these memory devices can function as an electronic secure key. A security controller independent from the main processor of the compute device can read the memory devices and verify that the correct number of physical security devices is present and that the memory devices each presents a valid authentication key fragment (portion) prior to commencing operation of the computer system. For example, the electronic security apparatus and methods described herein can limit access to the electronic devices (e.g., embedded electronic devices, compute devices, and/or embedded compute devices) to individuals in possession of a physical memory device(s).

The electronic security apparatus and methods described herein can be performed by one or more memory devices and one or more compute devices that collectively authenticate a user(s)'s permission to the one or more compute devices, and can therefore, allow for an efficient and secure operation of the one or more compute devices. In particular, the electronic security apparatus and methods described herein authenticate a user(s) of the one or more compute device(s) using an one or more memory devices (storing electronic secure keys) that operates apart from normal operation of the one or more compute devices. The separation of an authentication process and normal processes of the one or more compute devices described herein can increase security, hardware density, functionality, performance, while reducing cost, size, and power consumption.

FIG. 1 is a block diagram that illustrates a memory device 120 (also the "electronic secure key") that is used in conjunction with a compute device 140, according to an embodiment. The compute device 140 can be, for example, a desktop computer, a laptop computer, a mainframe computer, a high-performance computer, a smart watch, a tablet, an embedded electronic device, a compute device of an automobile, a compute device of an aircraft, a compute device of a surgery room, and/or the like. The compute device 140 can be a general-purpose device or can be configured to perform a specialized task such as, for example, rendering a video, processing a document, analyzing data, controlling an aircraft, operating a medical device, and/or the like. The memory device 120 is a removable device (removable from the compute device 140) that can be, for example, an individual handheld device (e.g., an encrypted universal serial bus (USB) key), an integrated circuit implanted in a device (e.g., a chip in a watch), and/or the like. A user can removably and operatively couple the memory device 120 (the electronic secure key; which stores an encryption key) to the compute device 140 to authenticate the user's permission to access and/or operate the compute device 140.

The memory device 120 includes a controller 121, a set of memory portions 124A-D, a memory 122 that includes length values 123, and a set of ports 125A-D. The memory device 120 can include a printed circuit board (not shown) that mechanically support and connect the controller 121, the set of memory portions 124A-D, the memory 122, the set of ports 125A-D. The memory device 120. Although memory device 120 is shown with a certain number of memory portions, ports, etc., it should be understood any number of such components are possible in various implementations.

The controller 121 can be an electronic circuit that is operatively coupled to the set of memory portions 124A-D, the memory 122, and the set of ports 125A-D. The controller 121 can be or include a microcontroller and/or a microprocessor that process data received/sent from/to the set of memory portions 124A-D, the memory 122, and/or the set of ports 125A-D. The controller 121 can include a set of pins (not shown) that connect (via an electric wire, electromagnetic waveguide, an optical waveguide, and/or the like on the printed circuit board described above) the controller 121 to each of the set of memory portions 124A-D, the memory 122, the set of ports 125A-D. For example, the controller 121 can be an 8-bit microcontroller, a 32-bit microcontroller, an external-memory microcontroller, an embedded-memory microcontroller, a complex instruction set computer (CISC) microcontroller, a reduced instruction set computer (RSIC) microcontroller, and/or the like, that perform arithmetic and logic operations.

The set of memory portions 124A-D (can be one memory portion or multiple memory portions) store the encryption key. Each memory portion from the set of memory portions 124A-D can be/include for example, a magnetic memory, a flash drive, an erasable programmable read-only memory (EPROM), an embedded multi-time programmable (MTP) memory, an embedded multi-media card (eMMC), a universal flash storage (UFS) device, and/or the like, and store an encryption key portion from a set of encryption key portions of the encryption key. In some instances, each memory portion from the set of memory portions 124A-D can store information including an indication of the number of memory portions in the set of memory portions 124A-D, an index for that memory portion, a size of the encryption key (e.g., a length value representing a number of bits of the encryption key), a size of the encryption key portion which that memory portion stores (e.g., a length value representing number of bits of the encryption key portion), a location of that memory portion (e.g., coordinates of that memory portion in the memory device 124A), a location of the encryption key portion which that memory portion stores (e.g., a memory address associated to that memory portion), and/or the like. The set of memory portions 124A-D, each can send a signal indicating the encryption key portion and the index for that memory portion to the controller.

Although the set of memory portions 124A-D, as shown, can be physically separate memory chips, in some implementations, the set of memory portions 124A-D can be parts of a single memory chip. For example, each memory portion from the set of memory portions 124A-D can be a matrix of memory cells in a single dynamic random-access memory device that includes multiple matrices of memory cells. In some instances, the set of memory portions 124A-D, each can have the same memory type (e.g., each memory portion can be an MTP memory, a flash drive, an eMMC, and/or the like). In some instances, the set of memory portions 124A-D, can include multiple memory types. For example, the memory portion 124C can be an MTP memory while the memory portion 124A is a few-time programmable (FTP) memory. Although the set of memory portions 124A-D, as shown, includes multiple memory portions, in some embodiments, the memory device can include a single memory portion that stores the entire encryption key. Moreover, although the memory portions 124A-D are shown to be part of the memory device 120, in some implementations, the set of memory portions 124A-D can be removable devices that can be attached (e.g., using a magnetic connector) to the memory device 120.

The memory 122 can be, for example, a memory buffer, a random-access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multi-media card (eMMC), a universal flash storage (UFS) device, and/or the like. The memory 122 stores the length values 123. Each length value from the set of length values 123 is associated with a length of each encryption key portion from the set of encryption key portions stored in the set of memory portions 124A-D. In some instances, in addition to the set of length values, the memory 122 can store an indication of the number of memory portions in the set of memory portions 124A-D, an index for each memory portion in the set of memory portions 124A-D, a size of the encryption key (e.g., a length value for the encryption key), a set of coordinates for the set of memory portions 124A-D, a set of memory addresses for the set of encryption key portions, and/or the like.

The set of ports 125A-D can be/include a set of electrical connectors and/or optical waveguides that can physically connect to other ports on an external device (e.g., the compute device 140, a wire connector, a fiber connector, and/or the like) and facilitate transmission of data from/to the memory device 120 to/from the external device (such as compute device 140). In some instances, the set of ports 125A-D can also facilitate transmission of power from/to the memory device 120 to/from the external device (such as compute device 140). For example, the memory device 120 can be configured not to include a power source and only operate when connected via at least one USB port to an external device (such as compute device 140) that is configured to provide power to the memory device 120.

The compute device 140 includes an authentication circuit 141, a processor 142, a memory 143, and a set of ports 145A-D. The compute device 140 can include a printed circuit board (not shown) that mechanically supports and connects (e.g., electrically, electromagnetically, optically, and/or the like) the authentication circuit 141, the processor 142, the memory 143, and the set of ports 145A-D.

The authentication circuit 141 (also referred to as the 'first circuit') can be, for example, a microcontroller, a microprocessor, an integrated circuit suitable for executing instructions or codes. For example, the authentication circuit 141 can include a microcontroller structurally similar to the controller 121 of the memory device 120. The authentication circuit 141 can perform a set of logical procedures and/or arithmetic procedures such as, for example, a detection procedure, a signal processing procedure, a data ordering procedure, an authentication procedure, and/or the like. For example, the authentication circuit 141 can receive from all ports 125A-D of the memory device 120 signals that are within a previously determined frequency band and a previously-determined amplitude range. The authentication circuit 141 can include an electronic circuitry portion that validates signals that are received at the ports 125A-D of the memory device 120 and that are within the previously determined frequency band and the previously-determined amplitude range. This electronic circuitry portion of authentication circuit 141 can also send a validation signal to at least another electronic circuitry portion of the authentication circuit 141, confirming detection of the presence of the memory device 120 and/or detection of a valid memory device 120.

The processor 142 (also referred to as the 'second circuit') can be, for example, a hardware based integrated circuit (IC) or any other suitable processing device configured to run or execute a set of instructions or a set of codes. For example, the processor 142 can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 142 can be a general purpose processor or can be a processor to perform a specialized task(s) such as, for example, rendering a video, processing a document, analyzing data, controlling an aircraft, operating a medical device, and/or the like. The processor 142 is operatively coupled to the memory 143 and the authentication circuit through, for example, a system bus (e.g., an address bus, data bus, and/or control bus; not shown). The processor 142 does not, however, access the memory 143 and does not perform the general tasks or specialized task(s) before receiving an authentication signal from the authentication circuit 141. To operate the processor 142, the authentication circuit 141 of the compute device 140 should authenticate a user's permission to access and/or operate the compute device 140.

The memory 143 can be, for example, a memory buffer, a random-access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multimedia card (eMMC), a universal flash storage (UFS) device, and/or the like. The memory 143 can store, for example, data and/or codes that includes instructions to cause the processor 142 to perform the specialized task. For example, the memory 143 can store an order 144 that can include (a) a first order defined by a first previously-defined list that specifies an order of each memory portion from the set of memory portions and/or (b) a second order defined by a second previously-defined list that specifies an order of each encryption key portion from the set of encryption key portions. For the processor 142 to access the instruction in the memory 143 to perform the specialized task, the authentication circuit 141 (the 'first circuit') should authorize access to the processor 142 based on an encryption key, and in some instances, a biometric information and/or a personal identification number (PIN). Furthermore, in some instances, the comptroller 121 can store a size of the encryption key (e.g., a number of bits of the encryption key) and/or a hash of the encryption key, that can be used, for example, to validate the encryption key.

The set of ports 145A-D can be structurally similar to the set of ports 125A-D and can facilitate transmission of data from/to the compute device 140 to/from an external device (such as memory device 120). A pairing of the set of ports 145A-D and the set of ports 124A-D can be a bijection. That is, a number of ports in the set of ports 125A-D of the memory device 120 can correspond to a number of ports in the set of ports 145A-D of the compute device 140 such that each port from the set of ports 125A-D of the memory device 120 is uniquely associated with a port from the set of ports 145A-D of the compute device 140. In some instances, when the authentication circuit 141 detects that the pairing of the set of ports 145A-D and the set of ports 124A-D is not a bijection, the authentication circuit 141 can be configured to deny access to the processor 142.

In use, when the compute device 140 is initially powered up, the authentication circuit 141 prevents the compute device 140 from commencing operation until the authentication circuit 141 verifies a presence of the encryption key, and optionally, a presence of valid security factors in the memory device 120 that include the authentication key (e.g., having a valid port type, signal amplitude, signal frequency, physical attributes, and/or the like). A user that wants access to the compute device 140 (e.g. to use the compute device for the specialized task) can connect the memory device 120 using the set of ports 125A-D to the compute device 140 using the set of ports 145A-D. The memory portions 124A-D each contains (stores) an encryption key portion (also referred to as the 'electronic security factor') from a set of encryption key portions that are received and read by the controller 121. In some instances, each memory portion from the set of memory portions 124A-D can include (store) one or more encryption key portions that can be encoded in that memory portion in a format different from an encoding (generally known data encoding) of auxiliary data also present in that memory portion. Therefore, a presence of the one or more encryption key portions can be kept hidden. In some instance, each memory portion from the set of memory portions 124A-D can be physically hidden (e.g., covered with a thin-film of a dielectric sheet over each memory portion) on the memory device 120. Therefore, the set of memory portions 124A-D can be protected from detection, decoding, copying, or tampering.

In response to connecting memory device 120 with compute device 140, the controller 121 can access the memory 122 to read the length values 123 (and optionally the indication of the number of memory portions in the set of memory portions 124A-D, the index for each memory portion, the size of the encryption key, the set of coordinates for the set of memory portions 124A-D, and/or the set of memory addresses for the set of encryption key portions 124A-D) stored in the memory 122. Each length value from the length values 123 indicates a length of a unique encryption key portion from the set of encryption key portions stored within a memory portion from the set of memory portions 124A-D. The controller 121 can then access each memory portion from the set of memory portions and obtain each encryption key portion stored in each memory portion based on the length value for that encryption key portion. For example, the length values 123 can include the array [356, 843, 9802, 43]. The controller can read 356 bytes of data from the memory portion 124A, 843 bytes of data from the memory portion 124B, 9802 bytes of data from the memory portion 124C, and 43 bytes of data from the memory portion 124D. The controller 121 can then send the set of encryption key portions, from the memory device 120 and via the set of ports 125A-D, to the compute device 140.

The authentication circuit 141 (also referred to as the 'security controller') can detect that the memory device 120 is operatively coupled to the compute device 140 and receive or fetch, via the set of ports 145A-D, the set of encryption key portions from the memory device 120 after detecting that the memory device 120 is operatively coupled to the compute device 140. After receiving the encryption key portions, the authentication circuit 141 can assemble the encryption key by ordering the set of encryption key portions using (1) a first order defined by a first previously defined list that specifies an order of each memory portion from the set of memory portions and (2) a second order defined by a second previously-defined list that specifies an order of each encryption key portion from the set of encryption key portions. This process is discussed further through the use of an example set of length values 123 represented by the array [356, 843, 9802, 43], the first order represented by the array [3, 2, 4, 1], and the second order represented by the array [4, 1, 3, 2].

The first order for the set of memory portions can be used together with the length values 123 to determine a length value from the set of length values 123 for each memory portion from the set of memory portions. As mentioned above for this example, the first order can include the array [3, 2, 4, 1] and the length values 123 can include the array [356, 843, 9802, 43] to determine which length value from the array should be associated with which memory portion. In this example, the authentication circuit 141 can receive/fetch, using the controller 121, 356 bytes of data from the third memory portion (e.g., the memory portion 124C), 843 bytes of data from the second memory portion (e.g., the memory portion 124B), 9802 bytes of data from the fourth memory portion (e.g., the memory portion 124D), and 43 bytes of data from the first memory portion (e.g., the memory portion 124A). In other words, the first position in the array representing the first order is "3", the first value in the array representing the set of length values is "356" and thus the 356 bytes from the third memory is received/fetched; the second position in the array representing the first order is "2", the second position in the array representing the set of length values is "843" and thus 843 bytes from the second memory is received/fetched; etc. Separately, the second order can be used to arrange the set of encryption key portions to produce the encryption key. The authentication circuit 141 can use the second order that includes the array [4, 1, 3, 2] to arrange the bytes of data in the order of: 9802 bytes of data from the fourth memory portion, 43 bytes of data from the first memory portion, the 356 bytes of data from the third memory portion, and 843 bytes of data from the second memory portion, to produce the encryption key with the overall 11,044 bytes of data. In other words, the first position in the array representing the second order is "4", which is used to identify the 9802 bytes received/fetched from the fourth memory portion (e.g., the memory portion 124C) and arranged into the first portion of the encryption key; the second position in the array representing the second order is "1", which is used to identify the 43 bytes received/fetched from the first memory portion (e.g., the memory portion 124A); etc. In sum, in this example, the first order is used to correlate length values with memory portions, and the second order is used to correlate encryption key portions with positions within the arranged encryption key.

Each of the first previously defined list and the second previously defined list can be stored in the order 144 of the memory 143 of compute device 140 or be accessible by the authentication circuit 141. But the first previously defined list and the second previously defined list are not stored at or accessible by the memory device 120. The authentication circuit 141 can then authenticate the encryption key and authorize the user access to the processor 142.

A physical layout, a number of, a connection type of, and/or an encoding of encryption key portions in a memory device 120 can vary depending on constraints of the memory device 120 and/or the compute device 140 such as, for example, a form factor or the memory device 120 and a size, a power consumption, a form factor and/or a weight of the compute device 140. For example, in some implementations, the compute device 140 can be a conventional size laptop device having enough size and power to support universal serial bus (USB) connections, a Thunderbolt® connection, and/or the like. Flexibility in choice of a physical layout of, a number of, a connection type of, and/or an encoding of the electronic security factors in the secure key, as described above, can allow for an exact security requirements of a specific electronic device and/or a compute device to be satisfied in a manner that also meets the specific constraints on size, power consumption, form factor and weight present in each of the specific electronic device and/or the compute device.

In some instances, the set of encryption key portions can be further encoded or encrypted to provide additional protection. For example, the set of encryption key portions can be further encoded or encrypted at the memory device 120 to produce encoded or encrypted encryption key portions, and the encoded or encrypted encryption key portions can be decoded or decrypted at the compute device 140. Moreover, in some instances, the set of encryption key portions can be manufactured, loaded, and/or programmed into the set of memory portions 124A-D. For example, a first encryption key portion can be manufactured as an integrated circuit on the memory portion 124A and a second encryption key portion can be programmed into the memory portion 124C. In some instances, the set of encryption key portions can include physical attributes or characteristics of the set of memory portions 124A-D themselves.

In some implementations, the authentication circuit can withhold power from the compute device 140 or keep the compute device 140 in a reset state until the authentication function is successfully completed. For example, the authentication circuit 141 can control a switch between a power source (not shown) of compute device 140 and the processor 142; this switch can prevent power from being provided to the processor 142 until the authentication function is successfully completed by the authentication circuit 141. In some implementations, the authentication circuit 121 can receive, in addition to the encryption key, a signal indicating biometric information of a user, and/or a signal indicating a personal identification number (PIN). The authenticate circuit 121 can authenticate the user based on the encryption key, and the biometric information and/or the PIN.

In some implementations, the printed circuit board (not shown) of the memory device 120 and/or the printed circuit board (not shown) of the compute device 140 can be or include a compartmentalized printed circuit board as described in U.S. patent application Ser. No. 17/169,703 filed Feb. 8, 2021 and entitled "ISOLATION OF COMPARTMENTS IN A LAYERED PRINTED CIRCUIT BOARD AND APPARATUS AND METHODS FOR THE SAME," which is incorporated herein by reference in its entirety.

In some implementations, the memory device 120 and/or the compute device 140 can include a secure electronic device housing as described in U.S. patent application Ser. No. 16/935,994 filed Jul. 22, 2020 and entitled "SECURE COMPUTE DEVICE HOUSING WITH SENSORS, AND METHODS AND SYSTEMS FOR THE SAME," which is incorporated herein by reference in its entirety.

In some implementations, the memory device 120 and/or the compute device 140 can include a modular embedded chassis as described in U.S. patent application Ser. No. 16/921,554 filed Jul. 6, 2020 and entitled "MODULAR EMBEDDED CHASSIS WITH FIRMWARE FOR REMOVABLY COUPLED COMPUTE DEVICES, AND METHODS AND SYSTEMS FOR THE SAME," which is incorporated herein by reference in its entirety.

Although the memory device 120 and the compute device 140 are each shown and described as a singular device, in some implementations, one or more memory devices and one or more compute devices can be used. In one example, multiple memory devices can be used to authenticate a single compute device. In another example, a single memory device can be used to authenticate multiple compute devices. Yet in another example, multiple memory devices can be used to authenticate multiple compute devices (e.g., in a large-scale computer system).

In some instances, the authentication circuit 141 can be included within a first compute device from a set of multiple compute devices that includes a second compute device and a third compute device. The second compute device can store the order defined by the first previously defined list. Therefore, the second compute device can authorize access to a circuit of the second compute device in response to being operatively coupled to the memory device. In other words, the memory device can be used to authenticate both the first compute device and the second compute device (storing the same order defined by the first previously defined list) but not other compute devices such as the third compute device. For example, the third compute device can be configured not to store or access the order defined by the first previously defined list. Therefore, the third compute device does not authorize access to a circuit of the third compute device in response to being operatively coupled to the memory device.

Figure 2:
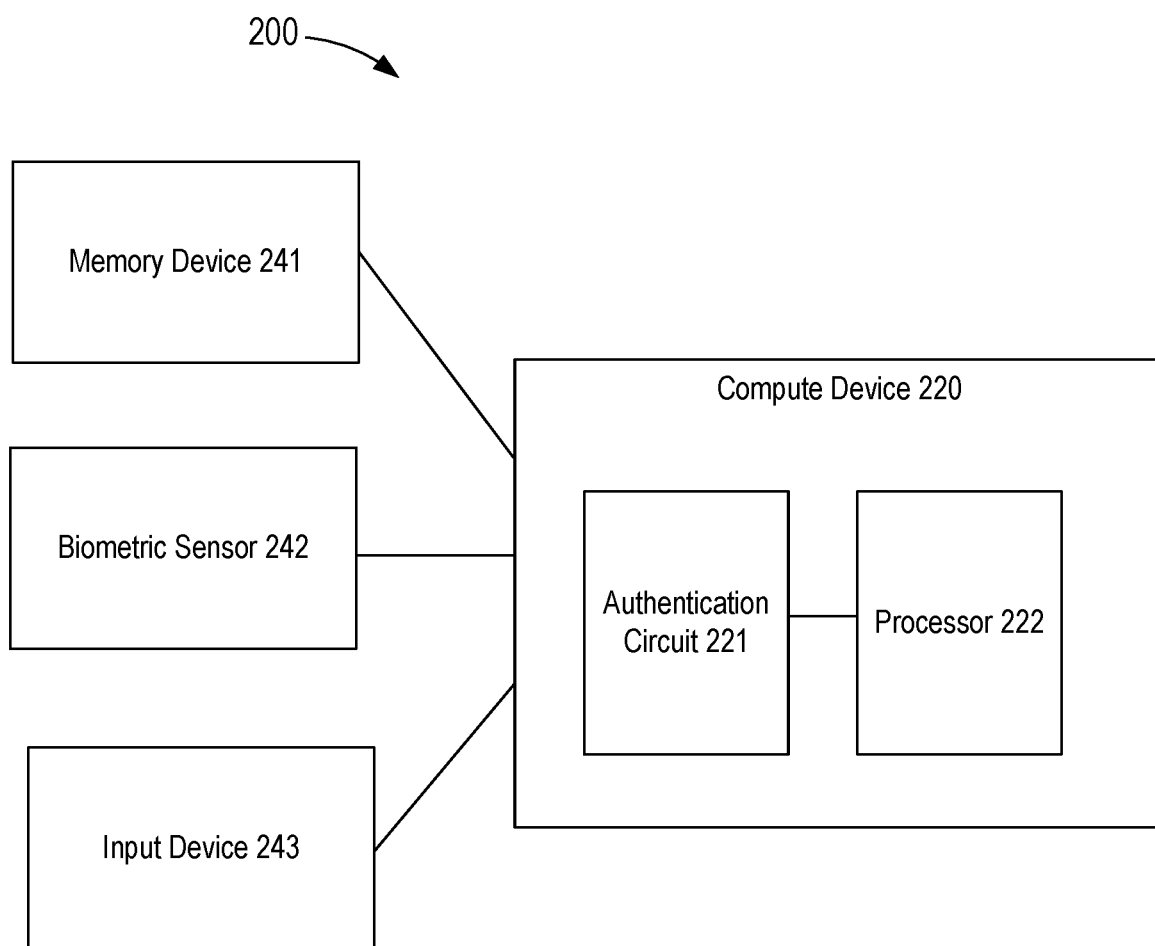
FIG. 2 is a block diagram that illustrates authentication of access to a compute device using a memory device a biometric sensor, and an input device, according to an embodiment.

FIG. 2 is a block diagram that illustrates authentication of access to a compute device 220 using a memory device 241 (electronic secure key), a biometric sensor 242, and an input device 243, according to an embodiment. The compute device 220 includes an authentication circuit 221 and a processor 222. The processor 222 can be structurally and/or functionally similar to the processor 142 of the compute device 140 as shown and described with respect to FIG. 1. Similarly, the authentication circuit 221 can be structurally and/or functionally similar to the authentication circuit 141 of the compute device 140 as shown and described with respect to FIG. 1. The compute device 220 can be operatively coupled to (e.g., using a set of ports similar to the set of ports 145A-D shown and described with respect to FIG. 1) the memory device 241 (e.g., structurally and/or functionally similar to the memory device 120 shown and described with respect to FIG. 1), the biometric sensor 242, and the input device 243. The authentication circuit 221 can detect at least the memory device 241 being operatively coupled (e.g., by a user) to the compute device 220 and send a request for an authentication key, biometric information, and/or a personal identification number (PIN) from the memory device 241, the biometric sensor 242, and the input device 243, respectively. In response to the request, the authentication circuit 221 can receive a first signal from the memory device 241, a second signal from the biometric sensor 242, and/or a third signal from the input device 243.

The first signal can indicate a set of encryption key portions that collectively represent the authentication key, received from the memory device 241. The second signal can indicate biometric information of a user that caused the memory device 241 to be operatively coupled to the first circuit. The third signal can indicate a personal identification number (PIN) of the user. The authentication circuit 221 can assemble the authentication key using the set of encryption key portions. Based on the authentication key, the biometric information of the user and/or the PIN of the user, the authentication circuit 221 can grant or deny access of the processor 222 to the user.

In some instances, based on contents of the authentication key, the biometric information of the user and/or the PIN of the user, the authentication circuit 221 can assign an access level to the user. In one example, the user can provide an authentication key for a first access level, provide biometric information for a second access level lower than the first access level, and provide the PIN of the user for a third access level lower than the first access level and the second access level. The authentication circuit 221 can grant the third access level when the user only provides the PIN of the user, can grant the second access level when the user provides at least the biometric information of the user, or can grant the first access level when the user provides at least the authentication key.

Although the compute device 220, the memory device 241, the biometric sensor 242, and the input device 243 are shown as singular devices, in some embodiments, one or more memory devices, one or more biometric sensors, and one or more input devices can be used to authenticate a user's access to one or more compute devices.

Figure 3:
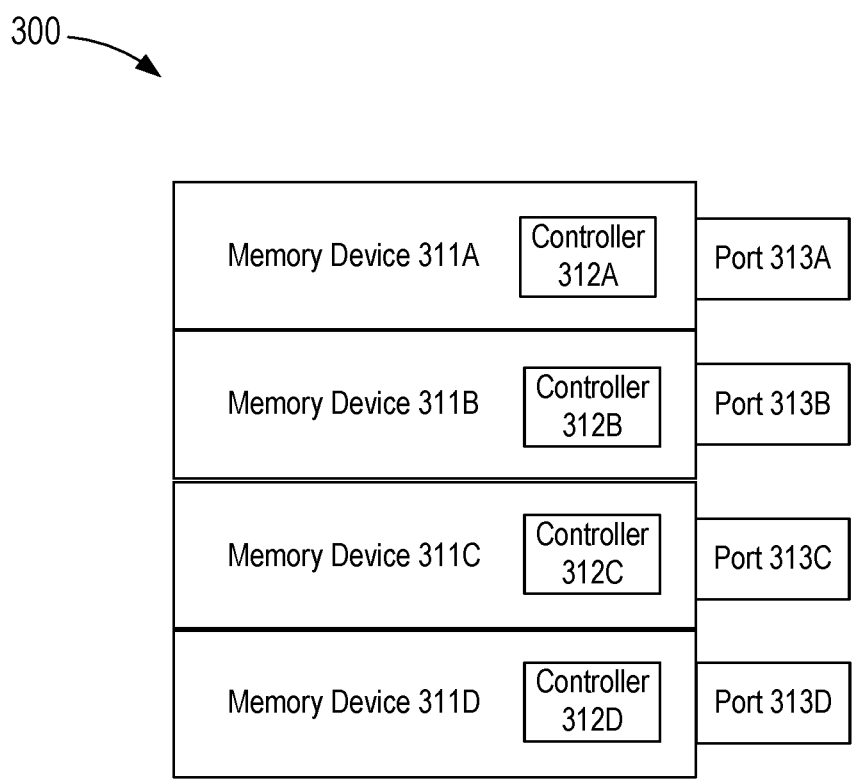
FIG. 3 is a block diagram that illustrates a set of memory devices, according to an embodiment.

FIG. 3 is a block diagram that illustrates a set of memory devices 311A-D (also referred to as the "electronic secure keys" or the "removable storage devices"), according to an embodiment. Each memory from the set of memory devices is physically distinct (e.g., not being on a single integrated circuit) from each remaining memory from the set of memory devices 311A-D. In one example, the set of memory devices 311A-D can include multiple USB thumb drives that are connected together (e.g., glued side-by-side, glued top-to-bottom, and/or the like). In another example, the set of memory devices 311A-D can include multiple USB thumb drives that are separated and that can be separately inserted into an external device (e.g., a compute device similar to the compute device 140 shown and described with respect to FIG. 1). Each memory device from the set of memory devices 311A-D has a controller from a set of controllers 312A-D and a port from a set of ports 313A-D. Each controller from the set of controllers 312A-D can be or include a microcontroller and/or a microprocessor that process data received/sent from/to a memory device, from the set of memory devices 311A-D, hosting that controller. Each port from the set of ports 313A-D can be/include a set of electrical connectors and/or optical waveguides that can physically connect to other ports on the external device and facilitate transmission of data from/to a memory device, from the set of memory devices 311A-D, hosting that port.

The set of memory devices 311A-D can collectively authenticate access of a user to a compute device (e.g., the compute device 140 shown and described with respect to FIG. 1; now shown in FIG. 3). In some instances, each memory device from the set of memory devices 311A-D contain an encryption key portion from a set of encryption key portions that can be used to collectively define an authentication key. For example, when the compute device is initially powered up, an authentication circuit of the compute device can prevent the compute device from commencing operation (or powering up) until the authentication circuit verifies a presence of the encryption key. A user(s) can connect the set of memory devices 311A-D using the set of ports 313A-D to the compute device. The set of controllers 312A-D can access the set of memory devices 311A-D to read each encryption key portion from the set of encryption key portions. The authentication circuit of the compute device can detect that the set of memory devices 311A-D are operatively coupled to the compute device and receive the set of encryption key portions via the set of ports 313A-D. After receiving the encryption key portions, the authentication circuit can assemble the encryption key, authenticate the encryption key, and authorize the user access to the processor 142.

Figure 4:
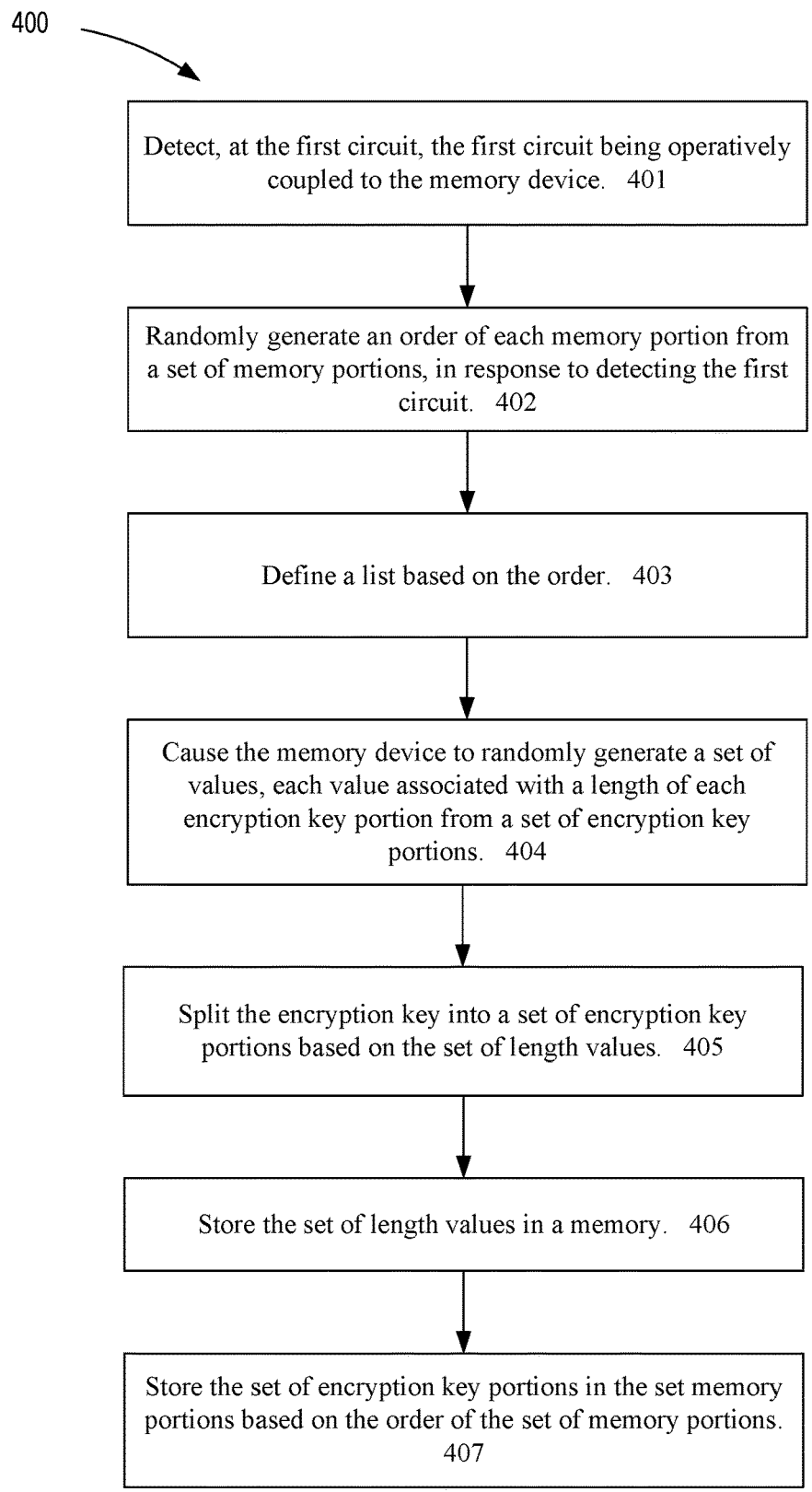
FIG. 4 is a flowchart illustrating a method for initializing a memory device and a compute device, according to an embodiment.

FIG. 4 is a flowchart illustrating a method 400 for initializing a memory device and a compute device, according to an embodiment. In some embodiments, the method 400 can be performed by a compute device similar to the compute device 140 shown and described in FIG. 1. At 401, the first circuit (e.g., an authentication circuit similar to the authentication circuit 141 shown and described in FIG. 1) is detected to be operatively coupled to the memory device. At 402, an order of each memory portion from a set of memory portions is randomly generated, in response to detecting the first circuit. At 403, a list is defined based on the order and after randomly generating the order. At 404, the memory device is caused to randomly generate a set of length values, each length value associated with a length of each encryption key portion from a set of encryption key portions. At 405, an encryption key portion can be split into the encryption key portions based on the set of length values. For example, the encryption key can be 100 bytes and the set of length values can be generated such that an addition of the length values is divisible by 10. The set of length values can include the array [2, 5, 3] that is used to split the encryption key portion to a first encryption key portion that has a length of 20 bytes, a second encryption key portion that has a length of 50 bytes, and a third encryption key portion that has a length of 30 bytes. At 406, the set of length values can be then stored in a memory (e.g., memory 122 as shown and described with respect to FIG. 2) other than the set of memory portions. At 407, after the encryption is split into the set of encryption key portions, the set of encryption key portions can be stored in their respective memory portion based on the order of the set of memory portions generated above.

Figure 5:
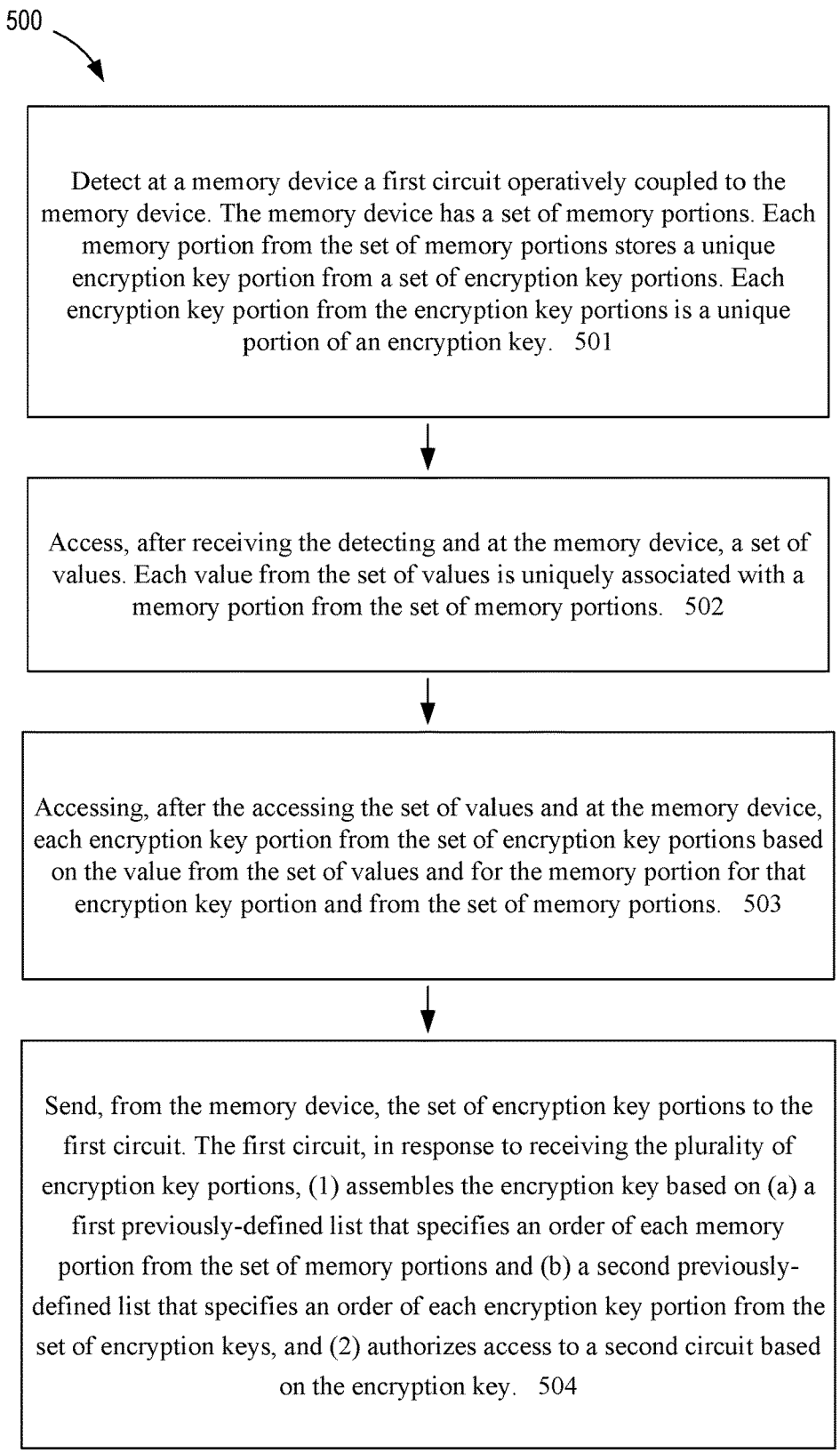
FIG. 5 is a flowchart illustrating a method for using a memory device and a compute device, according to an embodiment.

FIG. 5 is a flowchart illustrating a method 500 for using a memory device and a compute device, according to an embodiment. In some embodiments, the method 500 can be performed by a memory device similar to the memory device 120 shown and described in FIG. 1. At 501, a first circuit (e.g., an authentication circuit similar to the authentication circuit 141 shown and described in FIG. 1) is detected to be operatively coupled to the memory device. For example, the memory device can include a controller and a set of ports, similar to the controller 121 and the set of ports 125A-D as shown and described in FIG. 1, that can collectively detect the first circuit being operatively coupled to the memory device. The memory device has a set of memory portions. Each memory portion from the set of memory portions stores a unique encryption key portion from a set of encryption key portions. Each encryption key portion from the encryption key portions is a unique portion of the overall encryption key.

At 502, after the detecting and at the memory device, a set of values can be accessed. Each value from the set of values is uniquely associated with a memory portion from the set of memory portions. For example, the set of values can indicate a length (e.g., number of bits, number of bytes, etc.) of the set of encryption key portions. In some instances, the set of values can include a first value and a second value different from the first value. In one example, the set of values can include the number array [123, 6743, 8, 98, 123] that can include a first subset of numbers (e.g., [6743, 8, 98]) that have different values, a second subset of numbers (e.g., [123, 123]) that have the same values, and a third subset of numbers that have a mixture of the same values and different values (e.g., [123, 123, 8, 98]). Because the set of values can indicate a length of the set of encryption key portions, the set of encryption key portions can also include, for example, a first encryption key portion that has a length and a second encryption key portion that has a length different from the length of the first encryption key portion.

At 503, after the accessing the set of values and at the memory device, each encryption key portion from the set of encryption key portions can be accessed based on the value from the set of values and for the memory portion for that encryption key portion and from the set of memory portions. At 504, the set of encryption key portions are sent from the memory device to the first circuit. The first circuit, in response to receiving the set of encryption key portions, (1) assembles the encryption key based on (a) a first previously-defined list that specifies an order of each memory portion from the set of memory portions and (b) a second previously-defined list that specifies an order of each encryption key portion from the set of encryption keys, and (2) authorizes access to a second circuit (e.g., a processor similar to the processor 142 shown and described in FIG. 1) based on the encryption key. For example, after the first circuit authorizes access to the second circuit, a user (e.g., that connected the memory device and the compute device) can cause the processor to perform a specialized task (e.g., rendering a video, processing a document, analyzing data, controlling an aircraft, operating a medical device, and/or the like).

In some instances, the method 500 can be performed by the memory device at a first time period. The memory device can be initialized, by an initialization method, at a second time period before the first time period. The initialization method can include detecting, at the memory device, that the memory device is operatively coupled to the first circuit of the compute device. The initialization method can further include randomly generating the set of values in response to detecting during the second time period. Each value from the set of values can be associated with a length of each encryption key portion from the set of encryption key portions. The initialization method can further include receiving, from the compute device, the first previously-defined list that specifies the order of each memory portion from the set of memory portions. The initialization method can further include storing in each memory portion from the set of memory portions a unique encryption key portion from the set of encryption key portions based on the set of values and according to the order. In some instances, the initialization method can further include receiving, from the compute device, the second previously-defined list that define a second order used to arrange the set of encryption key portions to assemble the encryption key.

In some embodiments, the first circuit authorizes access to the second circuit based on (1) the encryption key, and (2a) biometric information of a user that caused the memory device to be operatively coupled to the first circuit, and/or (2b) a personal identification number (PIN) of the user. For example, the first circuit can be operatively coupled to a biometric sensor 242 to receive biometric information of the user and/or an input device to receive the personal identification number (PIN) of the user.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    detecting, at a first circuit, the first circuit being operatively coupled to a memory device having a plurality of memory portions;
    receiving, from the memory device and at the first circuit, a plurality of encryption key portions after the detecting, each encryption key portion from the encryption key portions being a unique portion of an encryption key, the plurality of encryption key portions including a first encryption key portion having a length and a second encryption key portion having a length different from the length of the first encryption key portion;
    assembling the encryption key by ordering each encryption key portion from the plurality of encryption key portions based on (1) a first order defined by a first previously-defined list that specifies an order of each memory portion from the plurality of memory portions and (2) a second order defined by a second previously-defined list that specifies an order of each encryption key portion from the plurality of encryption key portions, the first previously-defined list and the second previously-defined list each is stored at or accessible by the first circuit but not stored at or accessible by the memory device; and
    authorizing access to a second circuit based on the encryption key.

2. The method of claim 1, wherein:
    the receiving includes receiving the plurality of encryption key portions after the memory device has accessed each encryption key portion from the plurality of encryption key portions based a value from the plurality of values for that encryption key portion, each value from the plurality of values being associated with a length of each encryption key portion from the plurality of encryption key portions.

3. The method of claim 1, wherein the detecting, the receiving, the assembling and the authorizing are performed in a first time period, the method further comprising:
    initializing, at a second time period before the first time period, the memory device by performing the following:
        detecting, at the first circuit, the first circuit being operatively coupled to the memory device;
        randomly generating the order of each memory portion from the plurality of memory portions, in response to detecting during the second time period;
        defining the first previously-defined list based on the order after randomly generating the order; and
        causing the memory device to randomly generate a plurality of values, each value from the plurality of values associated with a length of each encryption key portion from the plurality of encryption key portions.

4. The method of claim 1, wherein:
    the first circuit is included within a first compute device from a plurality of compute devices that includes a second compute device and a third compute device,
    the second compute device storing the order defined by the first previously-defined list, the second compute device configured to authorize access to a circuit of the second compute device in response to be operatively coupled to the memory device,
    the third compute device not storing or accessing the order defined by the first previously-defined list, the third compute device configured to not authorize access to a circuit of the third compute device in response to be operatively coupled to the memory device.

5. The method of claim 1, further comprising:
    receiving, at the first circuit, a signal indicating biometric information of a user that caused the memory device to be operatively coupled to the first circuit;
    receiving, at the first circuit, a signal indicating a personal identification number (PIN) of the user; and
    authenticating the user based on the encryption key, the biometric information and the PIN,
    the authorizing access to a second circuit being based on the encryption key, the biometric information, and the PIN.

6. The method of claim 1, wherein each memory portion from the plurality of memory portions is disposed on a different memory device from a plurality of memory devices, each memory device from the plurality of memory devices being physically distinct from each remaining memory device from the plurality of memory devices.

7. A method, comprising:
    detecting at a memory device a first circuit being operatively coupled to the memory device, the memory device having a plurality of memory portions, each memory portion from the plurality of memory portions storing a unique encryption key portion from a plurality of encryption key portions, each encryption key portion from the plurality of encryption key portions being a unique portion of an encryption key, the plurality of encryption key portions including a first encryption key portion having a length and a second encryption key portion having a length different from the length of the first encryption key portion;
    accessing, after receiving the detecting and at the memory device, a plurality of values, each value from the plurality of values uniquely associated with a memory portion from the plurality of memory portions;
    accessing, after the accessing the plurality of values and at the memory device, each encryption key portion from the plurality of encryption key portions based on the value from the plurality of values and for the memory portion for that encryption key portion and from the plurality of memory portions; and
    sending, from the memory device to the first circuit, the plurality of encryption key portions to the first circuit such that the first circuit, in response to receiving the plurality of encryption key portions, (1) assembles the encryption key based on (a) a first previously-defined list that specifies an order of each memory portion from the plurality of memory portions and (b) a second previously-defined list that specifies an order of each encryption key portion from the plurality of encryption keys, and (2) authorizes access to a second circuit based on the encryption key.

8. The method of claim 7, wherein the plurality of values includes a first value and a second value different from the first value.

9. The method of claim 7, wherein the detecting, the accessing the plurality of values, the accessing the plurality of encryption key portions, and the sending are performed in a first time period, the method further comprising:
  initializing, at a second time period before the first time period, the memory device by performing the following:
    detecting, at the memory device, the memory device being operatively coupled to the first circuit;
    randomly generating the plurality of values in response to detecting during the second time period, each value from the plurality of values associated with a length of each encryption key portion from the plurality of encryption key portions;
    receiving, from the compute device, the first previously defined list that specifies the order of each memory portion from the plurality of memory portions; and
    storing in each memory portion from the plurality of memory portions a unique encryption key portion from the plurality of encryption key portions based on the plurality of values and according to the order.

10. The method of claim 7, wherein:
the first circuit is included within a first compute device from a plurality of compute devices that includes a second compute device and a third compute device,
the second compute device storing the order defined by the first previously defined list, the second compute device configured to authorize access to a circuit of the second compute device in response to be operatively coupled to the memory device,
the third compute device not storing or accessing the order defined by the first previously defined list, the third compute device configured to not authorize access to a circuit of the third compute device in response to be operatively coupled to the memory device.

11. The method of claim 7, wherein the sending includes sending the plurality of encryption key portions to the first circuit such that the first circuit, in response to receiving the plurality of encryption key portions authorizes access to the second circuit based on the encryption key, biometric information of a user that caused the memory device to be operatively coupled to the first circuit, and a personal identification number (PIN) of the user.

12. The method of claim 7, wherein each memory portion from the plurality of memory portions is disposed on a different memory device from a plurality of memory devices, each memory device from the plurality of plurality of memory devices being physically distinct from each remaining memory device from the plurality of memory devices.

13. An apparatus, comprising:
a memory device having a controller and a plurality of memory portions operatively coupled to the controller,
the memory device configured to store in each memory portion from the plurality of memory portions a unique encryption key portion from a plurality of encryption key portions, each encryption key portion from a plurality of encryption key portions being a unique portion of an encryption key, the plurality of encryption key portions including a first encryption key portion having a length and a second encryption key portion having a length different from the length of the first encryption key portion,
the memory device configured to store a plurality of values, each value from the plurality of values indicating a length of a unique encryption key portion from a plurality of encryption key portions stored within the memory portion from the plurality of memory portions and for that encryption key portion,
the memory device configured to access each encryption key portion from the plurality of encryption key portions based the value from the plurality of values for that encryption key portion,
the memory device configured to send, to the first circuit, the plurality of encryption key portions to the first circuit such that the first circuit, in response to receiving the plurality of encryption key portions, assembles the encryption key and authorizes access to a second circuit based on the encryption key.

14. The apparatus of claim 13, further comprising:
the first circuit;
a biometric sensor operatively coupled to the first circuit, the biometric sensor configured to send a signal indicating biometric information of a user that caused the memory device to be operatively coupled to the first circuit; and
an input device operatively coupled to the first circuit, the input device configured to send a signal indicating a personal identification number (PIN) of the user,
the first circuit configured to authenticate the user based on the encryption key, the biometric information and the PIN,
the first circuit configured to authorize access to a second circuit based on the encryption key, the biometric information and the PIN.

15. The apparatus of claim 13, wherein the memory device is configured to store the plurality of encryption key portions, to store the plurality of values, to access and to send in a first time period, the memory device further configured to:
  initialize, at a second time period before the first time period, the memory device by performing the following:
    detecting, at the memory device, the memory device being operatively coupled to the first circuit;
    randomly generating the plurality of values in response to detecting during the second time period, each value from the plurality of values associated with a length of each encryption key portion from the plurality of encryption key portions;
    receiving, from the compute device, (1) a first previously-defined list that specifies an order of each memory portion from the plurality of memory portions and (2) a second previously-defined list that specifies an order of each encryption key portion from the plurality of encryption key portions; and
    storing in each memory portion from the plurality of memory portions a unique encryption key portion from a plurality of encryption key portions based on the plurality of values and according to (1) the order of each memory portion from the plurality of memory portions and (2) the order of each encryption key portion from the plurality of encryption key portions.

16. The apparatus of claim 15, wherein:
the first circuit is included within a first compute device from a plurality of compute devices that includes a second compute device and a third compute device,
the second compute device storing the order defined by the first previously-defined list, the second compute device configured to authorize access to a circuit of the second compute device in response to be operatively coupled to the memory device, the third compute device not storing or accessing the order defined by the first previously-defined list, the third compute device configured to not authorize access to a circuit of the third compute device in response to be operatively coupled to the memory device.

17. The apparatus of claim 13, wherein each memory portion from the plurality of memory portions is disposed on a different memory device from a plurality of memory devices, each memory device from the plurality of plurality of memory devices being physically distinct from each remaining memory device from the plurality of memory devices.

\* \* \* \* \*